United States Patent
Wang et al.

(10) Patent No.: US 12,284,164 B2
(45) Date of Patent: Apr. 22, 2025

(54) PREVENTING FRAUD IN AGGREGATED NETWORK MEASUREMENTS

(71) Applicant: Google LLC, Mountain View, CA (US)

(72) Inventors: Gang Wang, Frederick, MD (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/656,044

(22) Filed: May 6, 2024

(65) Prior Publication Data

US 2024/0406153 A1 Dec. 5, 2024

Related U.S. Application Data

(63) Continuation of application No. 18/341,353, filed on Jun. 26, 2023, now Pat. No. 12,010,106, which is a
(Continued)

(30) Foreign Application Priority Data

Jan. 19, 2020 (IL) ........................................ 272126

(51) Int. Cl.
*H04L 29/06* (2006.01)
*H04L 9/08* (2006.01)
(Continued)

(52) U.S. Cl.
CPC ........ *H04L 63/0442* (2013.01); *H04L 9/0833* (2013.01); *H04L 9/085* (2013.01); *H04L 9/3093* (2013.01); *H04L 9/3257* (2013.01)

(58) Field of Classification Search
CPC ............... H04L 63/0442; H04L 9/0833; H04L 9/085; H04L 9/3093; H04L 9/3257
See application file for complete search history.

(56) References Cited

U.S. PATENT DOCUMENTS 9,641,332 B1 * 5/2017 Yung ......................... H04L 9/30
10,027,631 B2 * 7/2018 Belenkiy ................. H04L 63/06
(Continued)

FOREIGN PATENT DOCUMENTS

CN 101124770 2/2008
CN 106936787 7/2017
(Continued)

OTHER PUBLICATIONS

Datatracker.com [online], "Oblivious Pseudorandom Functions (OPRFs) using Prime-Order Groups," Feb. 2021, retrieved on Feb. 11, 2021, retrieved from URL <https://datatracker.ietf.org/doc/draft-sullivan-cfrg-voprf/> 2 pages.
Davidson et al., "Oblivious pseudorandom functions (OPRFs) using prime-order groups," Internet-Draft: Network Working Group, Nov. 2019, 40 pages.
(Continued)

*Primary Examiner* — Harunur Rashid
(74) *Attorney, Agent, or Firm* — Fish & Richardson P.C.

(57) ABSTRACT

Methods, systems, and apparatus, including a method for preventing fraud. In some aspects, a method includes: receiving, from multiple client devices, a measurement data element that includes a respective group member key and a group identifier for a given conversion as a result of displaying a digital component. Each client device uses a threshold encryption scheme to generate, based at least on network data that includes one or more of impression data or conversion data for the conversion, a group key that defines a secret for encrypting the network data and generate, based on data related to the application, the respective group member key that includes a respective share of the secret. In response to determining that at least the threshold number of measurement data elements having the same group identifier have been received, the network data is decrypted using the group member keys in the received measurement data elements.

19 Claims, 7 Drawing Sheets

Related U.S. Application Data continuation of application No. 17/419,060, filed as application No. PCT/US2020/064498 on Dec. 11, 2020, now Pat. No. 11,736,459.

(51) Int. Cl.
  *H04L 9/30* (2006.01)
  *H04L 9/32* (2006.01)
  *H04L 9/40* (2022.01)

(56) References Cited

U.S. PATENT DOCUMENTS

| | | | |
|---|---|---|---|
| 2005/0021479 | A1 | 1/2005 | Jorba et al. |
| 2005/0240591 | A1* | 10/2005 | Marceau ............. G06F 16/10 707/999.009 |
| 2014/0095297 | A1* | 4/2014 | O'Reilly ............ G06Q 30/0246 705/14.45 |
| 2015/0161398 | A1* | 6/2015 | De Cristofaro ........ G06Q 10/10 726/26 |
| 2018/0373882 | A1* | 12/2018 | Veugen ................ H04L 9/0869 |
| 2021/0004739 | A1* | 1/2021 | Gill ..................... G06Q 10/067 |

FOREIGN PATENT DOCUMENTS

| | | |
|---|---|---|
| CN | 107659401 A | 2/2018 |
| CN | 107659401 B | 8/2019 |
| CN | 110601822 | 12/2019 |
| EP | 3419211 | 12/2018 |
| JP | 2015-517163 | 6/2015 |
| KR | 10-2018-0025771 | 3/2018 |

OTHER PUBLICATIONS

Github.com [online], "Conversion Measurement," Feb. 2021, retrieved on Feb. 11, 2021, retrieved from URL <https://github.com/WICG/conversion-measurement-api/>, 15 pages.

International Preliminary Report on Patentability in International Appln. No. PCT/US2020/064,498, mailed on Jul. 28, 2022, 9 pages.

International Search Report and Written Opinion in International Appln. No. PCT/US2020/064498, mailed on Mar. 30, 2021, 16 pages.

Notice of Allowance in Chinese Appln. No. 202080009375.8, mailed on Jul. 15, 2024, 6 pages (with English translation).

Notice of Allowance in Japanese Appln. No. 2021-540867, mailed on Sep. 12, 2022, 5 pages (with English translation).

Notice of Allowance in Korean Appln. No. 10-2021-7021017, mailed on Feb. 27, 2024, 5 pages (with English translation).

Office Action in Chinese Appln. No. 202080009375.8, mailed on Jan. 6, 2024, 17 pages (with English translation).

Office Action in Indian Appln. No. 202127028951, mailed on Sep. 5, 2022, 5 pages (with English translation).

Office Action in Israel Appln. No. 272126, mailed on Aug. 7, 2022, 4 pages.

Office Action in Korean Appln. No. 10-2021-7021017, mailed on Oct. 11, 2023, 8 pages (with English translation).

Wikipedia.com [online], "Secret sharing," Feb. 2021, retrieved on Feb. 11, 2021, retrieved from URL <https://en.wikipedia.org/w/index.php?title=Secret_sharing&oldid=1004883637>, 8 pages.

Liu et al., "Towards Private and Efficient Ad Impression Aggregation in Mobile Advertising." ICC 2019-2019 IEEE International Conference on Communications (ICC). IEEE, May 2019, 6 pages.

* cited by examiner

PREVENTING FRAUD IN AGGREGATED NETWORK MEASUREMENTS

CROSS-REFERENCE TO RELATED APPLICATIONS

This application is a continuation application of, and claims priority to, U.S. patent application Ser. No. 18/341,353, filed Jun. 26, 2023, which is a continuation application of, and claims priority to, U.S. patent application Ser. No. 17/419,060, now U.S. Pat. No. 11,736,459, filed Jun. 28, 2021, which is a National Stage Application under 35 U.S.C. § 371 and claims the benefit of International Application No. PCT/US2020/064498, filed Dec. 11, 2020, which claims priority to Israel Application No. 272126, filed Jan. 19, 2020. The disclosures of the prior applications are considered part of and are incorporated by reference in the disclosure of this application.

BACKGROUND

Client devices transmit data over public networks, such as the Internet. These communications can be intercepted and/or altered by entities other than the intended recipient. In addition, entities can forge network identifies and send data that appears to originate from these forged network identities. An example of such forging is a Sybil attack in which an entity creates network identifies to subvert a reputation system of a peer-to-peer network.

SUMMARY

This specification describes technologies relating to determining aggregated network measurements in ways that prevent fraud and protects user privacy.

In general, one innovative aspect of the subject matter described in this specification can be embodied in methods that include receiving, from each of a plurality of client devices, a measurement data element that includes a respective group member key and a group identifier for a given conversion as a result of displaying a digital component, wherein an application executing on each client device uses a threshold encryption scheme to: generate, based at least on network data that includes one or more of impression data or conversion data for the conversion, a group key that defines a secret for encrypting the network data, each group member key including a respective share of the secret; and generate, based on data related to the application, the respective group member key, wherein each client device generates a different group member key that includes a different share of the secret; determining that at least a threshold number of measurement data elements having the group identifier have been received; and in response to determining that at least the threshold number of measurement data elements having the same group identifier have been received, decrypting the network data using the group member keys in the received measurement data elements. Using a threshold encryption technique to report network data to be aggregated prevents fraudulent reporting and protects user privacy, e.g., in situations in which the reported data is related to or includes user data. The generation of different group member keys enables the group key to be regenerated when any combination of group member keys totaling at least a threshold number of measurement data elements having the group identifier are received. Thus, the network data can be decrypted when at least the threshold group member keys are received, but cannot be decrypted if less than the threshold group member keys are received. By enabling such secret sharing between client devices without collaboration between the client devices protects user privacy by precluding communication between users' devices, reduces bandwidth consumed by such communication, and prevents measurement fraud that could occur if a single private key was simply passed out to each application. Other implementations of this aspect include corresponding apparatus, systems, and computer programs, configured to perform the aspects of the methods, encoded on computer storage devices.

These and other implementations can each optionally include one or more of the following features. The measurement data element may include encrypted data that represents network data and may include the group member key. The group member key may represent a portion of the group key and may be used to regenerate the group key only when a sufficient number of group member keys for the same impression and conversion pair are received. The conversion may be for a digital component and may involve the completion of a specified user action after the digital component is presented to or selected by the user. The impression data may be for a particular presentation of a digital component and may include a URL or domain of a landing page for the digital component (e.g., a page linked to by the digital component and when the user clicks or interacts with the digital component, the application/browser presents the page to the user), one or more identifiers for the digital component, event-level data associated with the impression, an expiration time that specifies when the impression data is to be deleted from the client device, and/or a reporting URL or domain to which conversion reports for the digital component are to be sent. The impression data may be provided by the digital component, e.g., as metadata of the digital component or an anchor tag of the digital component. The conversion data may include data that indicates a type of the conversion as some conversions may have multiple types. The type of a conversion may specify a subsequent action after the conversion is completed.

Each application may generate and send the measurement data element in response to occurrence of a conversion related to the impression data. The method can include determining a number of conversions for the digital component based on a number of received data elements that include the group identifier.

The method can include generating the group key based on blindly signed impression data. Using blindly signed impression data to blindly sign the network data enables such data to be checked for fraud while protecting user privacy. More generally, using blind signature techniques to blindly sign the network data enables such data to be checked for fraud while protecting user privacy. Portions of data elements that include network data can be blindly signed, for example by generating the group key based on blindly signed impression data and/or encrypted by multiple entities to prevent fraud or collusion from the multiple entities.

The blindly signed impression data can include blindly signed combined conversion data that includes: blinded impression data signed by a first system that determined that the impression was valid and a second system that determined to register the conversion, wherein the blinded impression data is generated by blinding the impression data; and conversion data signed by the second system. The generating the group key can include generating the group key using a combination of the blindly signed combined conversion data and a network address for a reporting system to which conversion data for the digital component is reported. Using a combination of such blindly signed data with threshold encryption techniques prevents fraud and protects user privacy. The blindly signed combined conversion data may be encrypted using a public key of the reporting system. The data related to the application can include a unique identifier for the application. The threshold encryption scheme can include a polynomial-based threshold encryption scheme. The application executing on each client device can include: generating, as the group key, a polynomial function based on a seed that includes at least the impression data; selecting a same point on the polynomial function to have a value that corresponds to the secret; and selecting, as the respective group member key, a second point on the polynomial function different from the same point using the data related to the application. Decrypting the impression data using the group member keys in the received measurement data can include generating the polynomial function using the second points; and identifying the same point on the generated polynomial function. The threshold encryption scheme can include one of a Chinese remainder theorem-based scheme, proactive secret sharing, or verifiable secret sharing.

The subject matter described in this specification can be implemented in particular embodiments so as to realize one or more of the following advantages. Threshold encryption techniques, such as (t, n)-threshold encryption schemes, described in this document can use the network data (e.g., impression and/or conversion data) or a portion or derivative thereof as a seed for generating a group key that is then split between multiple applications (e.g., web browsers or native applications) of multiple client devices that report the network data being measured. This enables each of the applications running on different client devices to generate the same group key that encrypts the network data using the same network data without collaboration between the applications (or client devices) and without requiring a central system to distribute the key to each application. Instead, each application at which a network event (e.g., an impression and associated conversion) occurs can use the network data that it receives, e.g., from a digital component and/or remote server, to generate the group key that encrypts the network data.

Each application can use different information to generate a group member key that, when combined with a sufficient number of other group member keys, can be used to regenerate the group key or another representation of the group key. For example, each application can use a unique identifier for the application to generate its group member key such that each application generates a different group member key than each other application without collaboration between the applications. This generation of different group member keys by each application enables the group key to be regenerated when any combination of group member keys totaling at least a threshold "t" number of group member keys are received. Thus, the network data can be decrypted when at least t group member keys are received, but cannot be decrypted if less than t group member keys are received. By enabling such secret sharing between applications without collaboration between the applications protects user privacy by precluding communication between users' devices, reduces bandwidth consumed by such communication, and prevents measurement fraud that could occur if a single private key was simply passed out to each application.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes cryptographic techniques for preventing fraud in determining aggregated network measurements. For example, the techniques described in this document can prevent fraud in determining aggregated impression and conversion measurements for digital components. The cryptographic techniques described in this document can also protect user privacy, e.g., by preventing other entities from being able to track or aggregate user data received from client devices of users.

Figure 1:
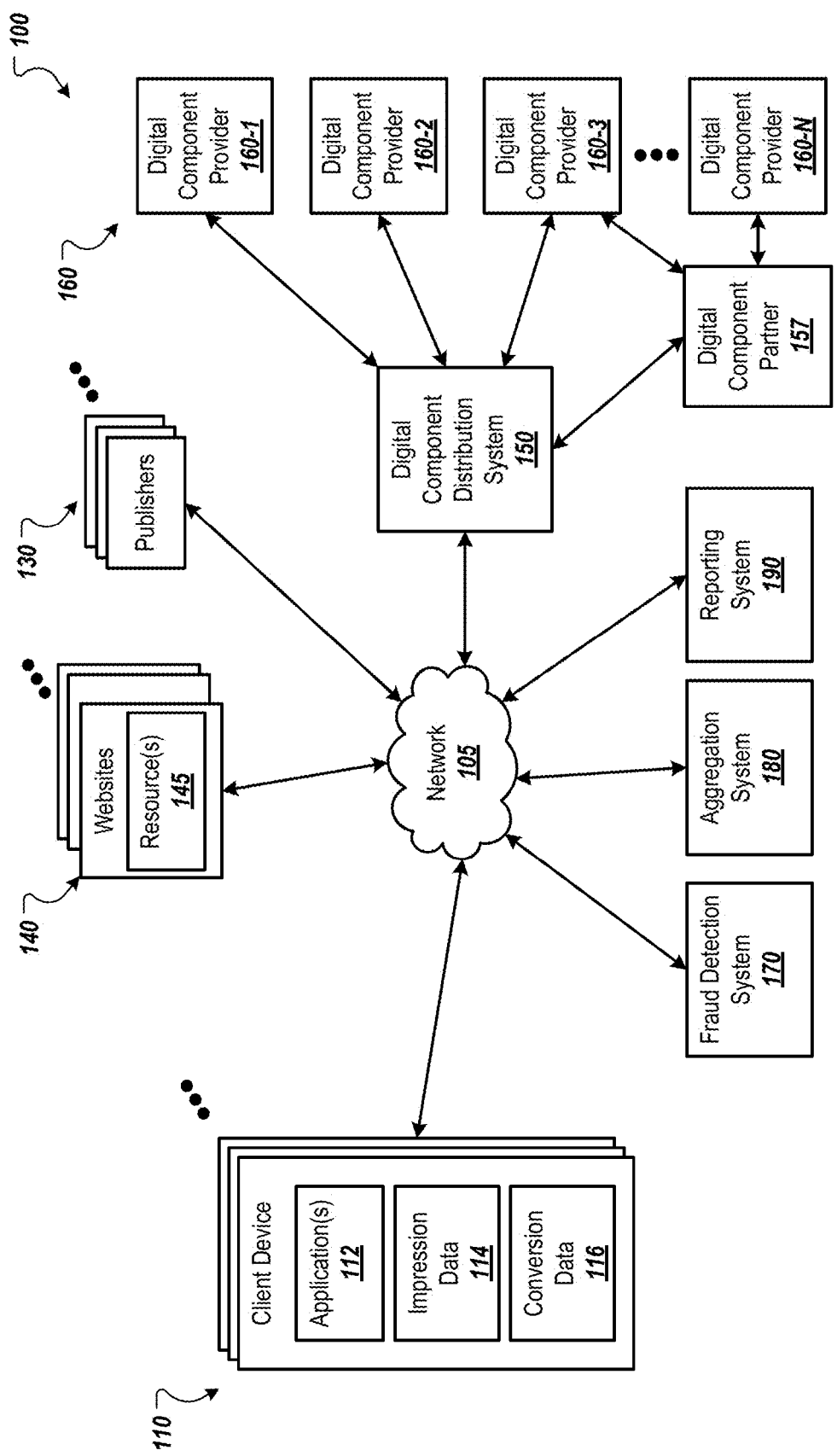
FIG. 1 is a block diagram of an environment in which a digital component system distributes digital components.

FIG. 1 is a block diagram of an environment 100 in which a digital component system 150 distributes digital components. The example environment 100 includes a data communication network 105, such as a local area network (LAN), a wide area network (WAN), the Internet, a mobile network, or a combination thereof. The network 105 connects client devices 110, publishers 130, websites 140, the digital component distribution system 150, a fraud detection system 170, an aggregation system 180, and a reporting system 190. The example environment 100 may include many different client devices 110, publishers 130, and websites 140. In some implementations, the environment 100 can also include multiple digital component distribution systems 150.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, and other devices that can send and receive data over the network 105.

A client device 110 typically includes applications 112, such as web browsers and/or native applications, to facilitate the sending and receiving of data over the network 105. A native application is an application developed for a particular platform or a particular device. Publishers 130 can develop and provide, e.g., make available for download, native applications to the client devices 110. In some implementations, the client device 110 is a digital media device, e.g., a streaming device that plugs into a television or other display to stream videos to the television. The digital media device can also include a web browser and/or other applications that stream video and/or present resources.

A web browser can request a resource 145 from a web server that hosts a website 140 of a publisher 130, e.g., in response to the user of the client device 110 entering the resource address for the resource 145 in an address bar of the web browser or selecting a link that references the resource address. Similarly, a native application can request application content from a remote server of a publisher 130.

Some resources 145, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components by the digital component distribution system 150 can thus supplement, and generally enhance, the web page or application content.

When the application 112 loads a resource 145 (or application content) that includes one or more digital component slots, the application 112 can request a digital component for each slot from the digital component distribution system 150. The digital component distribution system 150 can, in turn request digital components from digital component providers 160. The digital component providers 160 are entities that provide digital components for presentation with resources 145.

In some cases, the digital component distribution system 150 can also request digital components from one or more digital component partners 157. A digital component partner 157 is an entity that selects digital components 129 on behalf of digital component providers 160 in response to digital component requests.

The digital component distribution system 150 can select a digital component for each digital component slot based on various criteria. For example, the digital component distribution system 150 can select, from the digital components received from the digital component providers 160 and/or the digital component partners 157, a digital component based on relatedness to the resource 145 (or application content), performance of the digital component (e.g., a rate at which users interact with the digital component), etc. The digital component distribution system 150 can then provide the selected digital component(s) to the client device 110 for presentation with the resource 145 or other application content.

When the application 112 presents a digital component, the application 112 (which could be a browser) can store impression data 114 for the presentation of the digital component. The impression data 114 for a particular presentation of a digital component can include a URL or domain of a landing page for the digital component (e.g., a page linked to by the digital component and when the user clicks or interacts with the digital component, the application/browser presents the page to the user), one or more identifiers for the digital component, event-level data associated with the impression, an expiration time that specifies when the impression data is to be deleted from the client device 110, and/or a reporting URL or domain to which conversion reports for the digital component are to be sent. This data can be provided by the digital component, e.g., as metadata of the digital component or an anchor tag of the digital component. As described in more detail below, rather than storing or in addition to storing raw impression data for each impression of a digital component, the application 112 can store impression data that is blindly signed by the fraud detection system 170.

The application 112 can also store conversion data 116 in response to a conversion being detected. A conversion for a digital component is the completion of a specified user action after the digital component is presented to or selected by the user. The conversion data 116 for a conversion can include data that indicates a type of the conversion as some conversions can have multiple types. The type of a conversion can specify a subsequent action after the conversion is completed. For example, a conversion may be the addition of an item to an online shopping cart. In this example, a first type of conversion may be the addition of the item without checking out (e.g., not completing a purchase) and a second type of conversion may be the addition of the item with checking out. As described in more detail below, the conversion data for a conversion can be a set of one or more bits that indicate the type of conversion and the application can store conversion data that is blindly signed by the digital component distribution system 150 (or another appropriate system).

The fraud detection system 170 can evaluate fraud signals received from the client device 110 to determine whether an impression or conversion is valid or fraudulent. The fraud signals can be dependent on the application and can vary in different implementations. The application 112 (or the operating system on client device 110) can include an API that enables a digital component to make a call to the application 112 (or the operating system on client device 110) to collect the fraud detection signals and provide the fraud detection signals to the fraud detection system 170. In addition to the fraud detection signals, the application 112 can send blinded impression data for the impression to the fraud detection system 170. If the fraud detection system 170 determines that the impression is valid, the fraud detection system 170 can sign the blinded impression data and provide the signed blinded impression data to the application 112. Example techniques for generating blinded impression data and signing the blinded impression data are described below.

The aggregation system 180 can generate aggregated network measurements based on data received from client devices 110. In the following description, the techniques for generating and providing measurement data elements is described as being performed by the application 112, which can be a web browser or native application. However, in some implementations, the operating system of the client device 110 can generate and send the measurement data elements. In such implementations, the web browser(s) and application(s) on the client device 110 can be configured to report impressions and conversions to the operating system. The operating system can perform each of the operations for reporting the impressions and conversions described below as being performed by the application 112.

The application 112 on the client devices 110 can provide, to the aggregation system 180, measurement data elements that include encrypted data that represents network data. The network data can include impression data and/or conversion data for each conversion. For example, the application 112 can generate and send to the aggregation system 180, a measurement data element for each conversion for which conversion data is stored at the client device 110. The aggregated network measurements can include, for each of one or more digital components, a total number of conversions for the digital component across multiple client devices 110.

As described in more detail below, the application 112 can use an (t, n) threshold scheme to generate the data in a measurement data element. In some implementations, when the application 112 detects a conversion or receives conversion data for a conversion, the application 112 generates a group key (e.g., a polynomial function) based on impression data and conversion data for the conversion. The application can then generate a group member key that represents a portion of the group key and that can be used to regenerate the group key only when a sufficient number of group member keys for the same impression and conversion pair are received. In this example, the measurement data element for a conversion can include the group member key generated by the application and a tag that corresponds to the impression and conversion pair. Each unique impression and conversion pair can have a corresponding unique tag so that the aggregation system 180 can aggregate the measurement data elements for each impression and conversion pair using its tag.

In a (t, n)-threshold encryption scheme, the aggregation server 180 would need to receive at least t group member keys for the same impression and conversion pair to be able to decrypt the impression and conversion data. If less than t group member keys are received, the aggregation server 180 cannot decrypt the impression and conversion data. Once at least t measurement data elements for the same impression and conversion pair are received from client devices 110, the aggregation system 180 can determine the group key from the at least t group member keys and obtain the impression and conversion data from the group key, as described in more detail below.

The aggregation system 180 can determine the quantity of the conversions for an impression and conversion pair based on the number of measurement data elements received that includes impression data and conversion data for the impression and conversion pair. For example, after obtaining the impression and conversion data using the at least t group member keys, the aggregation system 180 can determine, as the quantity of conversions, a count of the number of the group member keys received for the impression and conversion pair. The aggregation system 180 can report the impression data, the conversion data, and the quantity of the conversions to the reporting system 190, which may be implemented as a reporting domain that corresponds to a reporting URL of the digital component that, in turn, corresponds to the impression and conversion data.

Figure 2:
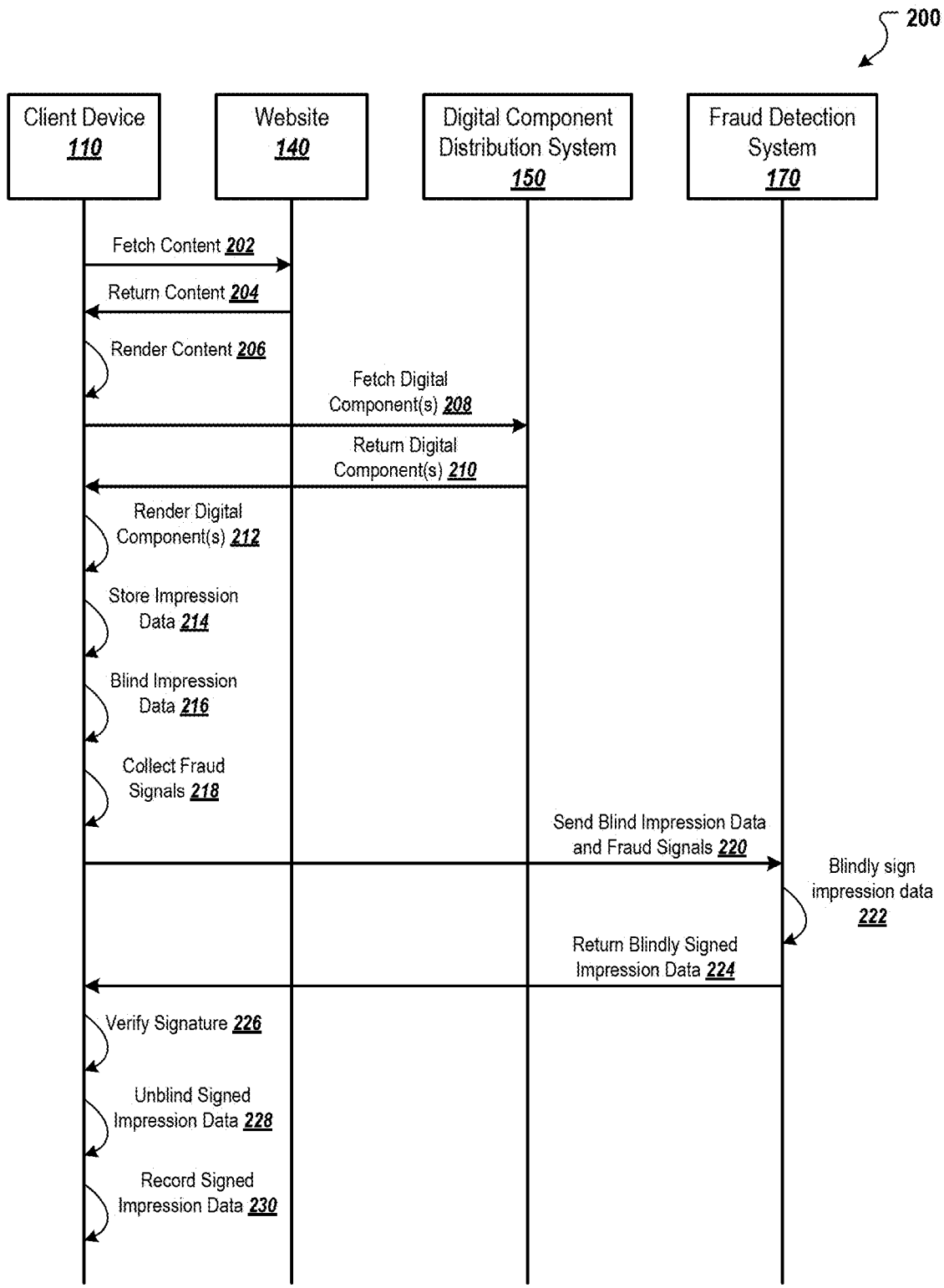
FIG. 2 is a flow diagram that illustrates an example process for recording signed impression data.

FIG. 2 is a flow diagram that illustrates an example process 200 for recording signed impression data. The process 200 can be implemented, for example, by a client device 110 interacting with a website 140, a digital component distribution system 150, and a fraud detection system 170. Operations of the process 200 can also be implemented as instructions stored on non-transitory computer readable media, and execution of the instructions by one or more data processing apparatus can cause the one or more data processing apparatus to perform the operations of the process 200.

The client device fetches content (202). An application 112 executing on the client device 110 can request the content from a remote server, e.g., a web server that hosts one or more websites 140 or an application content server that hosts content for one or more native applications. In this example, the application 112 requests a resource 145 from a website 140. A user can enter or select a URL that points to a website 140 hosted by a remote server. The application 112, e.g., a web browser, can generate a request for the resource 145 identified by the URL and send the request to the remote server. The request can include the URL of the resource 145.

The website 140 returns the content to the client device (204). The content can be a web page or other resource 145 that is identified by the URL. The application 112 can render the content on a display of the client device (206).

The content can include one or more digital component slots. The digital component slots can be filled by digital components received from the digital component distribution system 150. The digital component slots (or the resource 145) can include computer-readable instructions that can cause the application 112 to generate a request to the digital component distribution system 150 for the digital component(s).

The client device 110 requests one or more digital components (208). For example, the application 112 can generate the request in response to executing the computer-readable instructions of the digital component slot(s) or resource 145. The application 112 can send the request to the digital component distribution system 150.

The digital component distribution system 150 returns one or more digital components to the client device (210). As described above, the digital component distribution system 150 can select, from a set of digital components, a digital component based on various criteria, such as relatedness to the resource 145 (or application content) with which the digital component will be presented (e.g., this data can be included in the request), performance of the digital component, and/or other appropriate criteria. The digital component distribution system 150 can request, for inclusion in the set of digital components, digital components (or distribution criteria for the digital components) from digital component providers 160 and/or digital component partners 157. After selecting the digital component(s), the digital component distribution system 150 can send the digital component(s) to the client device 110.

The client device 110 renders the digital component(s) received from the digital component distribution system 150 (212). The application 112 can render the digital component(s) in the digital component slot(s) of the resource 145 (or application content). Although the rendering of the digital component(s) is shown in FIG. 2 as occurring after the content is rendered, the application 112 can render the content and the digital component(s) at the same time, e.g., by loading a web page with the digital component(s) in the digital component slot(s).

The client device 110 stores impression data for each digital component presented with the content (214). As described above, the impression data for a particular presentation of a digital component can include a URL or domain of a landing page for the digital component (e.g., a page linked to by the digital component), one or more identifiers for the digital component, an expiration time that specifies when the impression data is to be deleted from the client device 110, and/or a reporting URL or domain to which conversion reports for the digital component are to be sent (e.g., a reporting URL for the reporting system 190).

In some implementations, the application 112 registers, with the client device 110 (or operating system as mentioned above), each digital component presented with the content. For example, rendering a digital component can cause the digital component to be registered with the client device 110. A digital component can include a payload (e.g., non-visible data) and computer-readable instructions. The payload can include the impression data described above. The computer-readable instructions can cause the digital component to register with the application 112. For example, the digital component can include a call to an API exposed to the digital component by the application 112 or a conversion engine of the application 112 or of the client device 110. The call to the API can include the payload of the digital component. The application 112 can store the data in a registration table.

The application 112 blinds the impression data for each digital component presented with the content (216). The application 112 can use a blinding technique to blind the impression data for a digital component. In general, a blinding technique can apply a blinding factor to the impression data to generate blinded impression data that hides the actual impression data such that entities that receive the blinded impression data cannot determine the actual impression data absent knowledge of the blinding technique and parameters/keys used to generate the blinded impression data. In some implementations, the application 112 blinds the impression data for a digital component using the Verifiable, Oblivious Pseudorandom Function (VOPRF) protocol, which is an Internet Engineering Task Force (IETF) draft standard protocol to blind the impression data for a digital component. Other appropriate blind signing techniques can also be used.

The client device 110 or the application 112 collects fraud detection signals (218). As described above, the application 112 can include an API that enables a digital component to make a call to the application 112 to collect the fraud detection signals and provide the fraud detection signals to the fraud detection system 170.

The application 112 sends the blinded impression data for each digital component presented with the content and the fraud detection signals to the fraud detection system 170 (220). For example, the application 112 can send, to the fraud detection system 170 and for each digital component, a request to determine whether the impression of the digital component is valid or fraudulent. Each request can be specific to a given digital component or a single request can be sent for all digital components presented with the content.

The request can include the blinded impression data and the fraud detection signals. As the impression data is blinded, the fraud detection system 170 cannot access the actual impression data. This prevents the fraud detection system 170 from obtaining, collecting, or tracking user data of the user of the client device 110 that sent the blinded impression data. The fraud detection system 170 can evaluate the fraud detection signals to determine whether the impression(s) of the digital component(s) are valid or fraudulent. Thus, the fraud detection system 170 can determine, based on the fraud detection signals whether an impression event is valid, but cannot determine the content of the event or access the plaintext impression data.

If the fraud detection system 170 determines that an impression of a digital component is not valid (e.g., fraudulent), the fraud detection system 170 can ignore the request or respond to the request with data indicating that the impression is not valid. If the fraud detection system 170 determines that an impression of a digital component is valid, the fraud detection system 170 blindly signs the impression data for the digital component (222). The fraud detection system 170 can blindly sign the blinded impression data using a blind signing technique. In some implementations, the blind signing technique can be PrivacyPass from CloudFlare™, or trust token from Google Chrome™ browser, both of which is based on IETF VOPRF draft standard.

In general, blind signing techniques enable the digital signing of blinded data, e.g., using a secret blind signing key, without knowing the actual impression data and such that the resulting blind signature can be verified against the original, unblinded impression data. In some implementations, the fraud detection system 170 blindly signs the blinded impression data using the VOPRF protocol using a blind signing key of the fraud detection system 170. The fraud detection system 170 can maintain this blind signing key confidentially such that other entities cannot access the blind signing key.

The fraud detection system 170 sends the blindly signed impression data to the client device (224). For example, the fraud detection system 170 can send the blindly signed impression data to the client device 110 or application 112 in response to the request initiated by the client device 110 or application 112. The application 112 can verify the signature of the blinded impression data, e.g., using the VOPRF protocol. Similarly, the application 112 can unblind the blindly signed impression data (226). The application 112 can also unblind the blindly signed impression data using the VOPRF protocol that was used to blindly sign the blinded impression data. The application 110 records the signed impression data, e.g., by storing the signed impression data at the client device 110 and registering the impression in the registration table at the client device 110.

Figure 3:
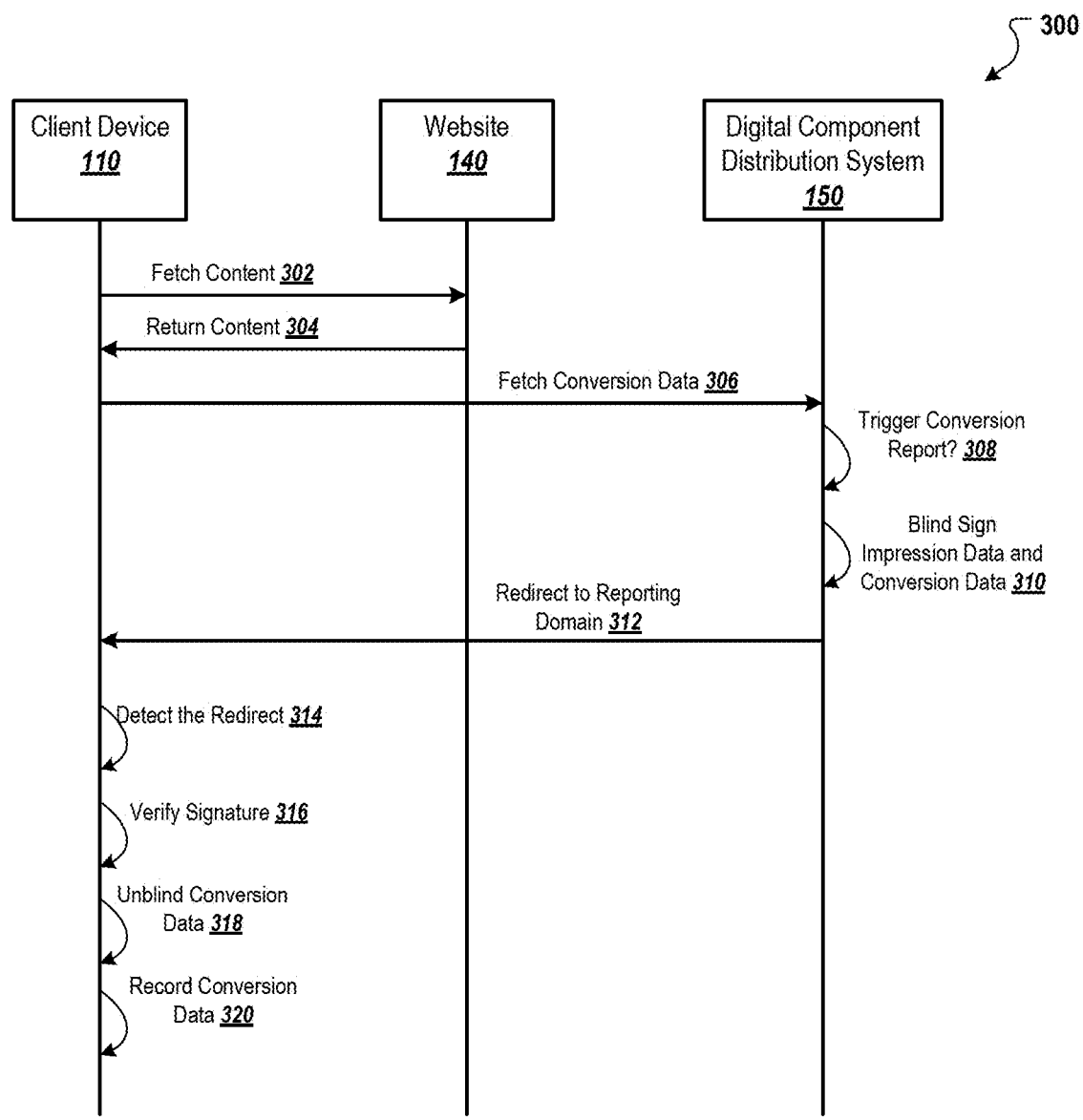
FIG. 3 is a flow diagram that illustrates an example process for recording conversion data.

FIG. 3 is a flow diagram that illustrates an example process 300 for recording conversion data. The process 300 can be implemented, for example, by a client device 110 interacting with a website 140 and a digital component distribution system 150. Operations of the process 300 can also be implemented as instructions stored on non-transitory computer readable media, and execution of the instructions by one or more data processing apparatus can cause the one or more data processing apparatus to perform the operations of the process 300.

The client device 110 fetches content (302). For example, an application 112 (e.g., a web browser or native application) executing on the client device 110 can request a landing page linked to by a digital component in response to a user interacting with, e.g., selecting or clicking, the digital component. The application 112 can send the request to a web server that hosts a web site 140 that includes the landing page.

The website 140 returns the content to the client device (304). The content can be a web page or other resource 145 that is identified by the URL. The application 112 can render the content on a display of the client device. The amount and nature of user interaction needed for a conversion is defined by individual digital component providers based on their needs. When a conversion actually happens, the landing page or the website owning the landing page notifies the application (browser) the occurrence of conversion. In other implementations, the conversion could happen in an app store for mobile apps, or web store for web apps, where the user downloads and installs the promoted app. This is commonly referred to as click-to-install conversion. In such cases, the app store or web store could notify the operating system, browser, or application that reports the conversion data of the occurrence of the conversion. Yet, in other implementations, the conversion could be a phone call by the user to the digital component provider. The operating system of the smartphone is aware of the phone call and can measure conversions (commonly referred to as click-to-call conversion).

The client device 110 fetches or otherwise receives conversion data (306). In some implementations, the content includes a conversion pixel. The conversion pixel can include a URL to a system that determines whether a conversion report should be generated, e.g., whether a conversion occurred and whether to record the conversion. In this example, the system that determines whether a conversion report should be generated is the digital component distribution system 150.

The conversion pixel can cause the application 112 to send data to the digital component distribution system 150. For example, the conversion pixel can include computer-readable instructions that cause the application 112 to determine whether the content (e.g., landing page) is registered in the registration table of the client device 110. As described above, the application 112 can record, in the registration table, impression data for a digital component presented by the application 112. The impression data for a digital component can include the URL or domain of a landing page for the digital component. The application 112 can search the registration table for the URL of the landing page presented as the content received in response to the user interacting with the digital component. For click-to-install conversion, the URL of the landing page would be a deep-linking URL pointing to the app listed in the app store/web store. For click-to-call conversion, the URL would encode the phone number of the digital component provider.

If the application 112 finds the URL of the landing page in the registration table, the client device 110 can send, to the digital component system 150 (or other system that determines when to trigger conversion reports), the blindly signed impression data for the digital component that includes the URL that matches the URL of the landing page. As described above, the blindly signed impression data includes the blinded impression data and a blind signature of the blinded impression data. In some implementations, the application 112 can include the blindly signed impression data in the message header of the request for the conversion pixel.

The digital component distribution system 150 determines whether to trigger a conversion report (308). The digital component distribution system 150 can determine whether to trigger a conversion report based on receiving the blindly signed impression data and user interaction with the content, e.g., with the landing page. For example, the publisher of the digital component interacted with by the user can define a conversion event, e.g., selecting a particular user interface control at the landing page, after the digital component was presented at the client device 110. The digital component distribution system 150 can interact with the web server that hosts the landing page (or the client device 110) to determine whether the conversion event occurred.

If the conversion event occurs, the digital component distribution system 150 can determine to trigger a conversion report for the digital component. If the conversion event is not detected, the digital component distribution system 150 can determine to not trigger a conversion report for the digital component.

If the digital component distribution system 150 determines to trigger a conversion report for the digital component, the digital component distribution system 150 blindly signs a combination of (i) the already blindly signed impression data and (ii) conversion data for the conversion (310). This conversion data can be a set of one or more bits that indicate the type of conversion, e.g., a subsequent action after the conversion is completed. For example, a single bit can be used to specify whether the user checked out after a conversion event of adding an item to a cart occurred. In this example, the bit may have a value of zero if a checkout did not occur and the bit may have a value of one if the checkout did occur. In other implementations, the conversion data can encode the amount that the user spent/purchased as part of the conversion.

The digital component distribution system 150 can blindly sign the combination of the blindly signed impression data and the conversion data using a secret blind signing key of the digital component distribution system 150, on behalf of the owner of the website/app store/web store where the conversion occurred. For brevity, this blindly signed combination of the blindly signed impression data and the conversion data is referred to as blindly signed combined conversion data. In some implementations, the conversion data is included as hidden bits of the blindly signed impression data. For example, the blindly signed impression data can be in the form of a set of bits and the conversion data can be specified by hidden bits. The digital component distribution system 150 can blindly sign this combination of bits and hidden bits using its secret blind signing key. At this point, the blinded impression data is blindly signed twice (e.g., double signed impression data) using the blind signing key of the fraud detection server 170 and the blind signing key of the digital component distribution system 150. The conversion data is blindly signed once using the blind signing key of the digital component distribution system 150.

In some implementations, the digital component distribution system 150 blindly signs the blindly signed impression data and the conversion data using the VOPRF protocol. The digital component distribution system 150 can maintain its blind signing key confidentially such that other entities cannot access the blind signing key. The blind signing key of the digital component distribution system 150 is different from the blind signing key of the fraud detection system 170 that was used to blindly sign the blinded impression data.

The digital component distribution system 150 notifies the client device 110 of the occurrence of a valid conversion. In some implementations, the digital component distribution system 150 sends, to the client device 110, a redirect to a reporting domain (312). For example, the redirect can include a URL to a domain of the reporting system 190. The redirect can also include the blindly signed combined conversion data.

In some implementations, the redirect has a particular form that can be detected by the application 112 (e.g., native application, browser, or operating system that reports the impressions and conversions). This particular form can include the URL of the reporting domain and metadata that includes the blindly signed combined conversion data. The metadata can be specified as a query parameter of the reporting domain's URL.

The application 112 executing on the client device 110 receives the redirect and detects the particular form of the redirect (314). The application 112 can treat redirects having the particular form as special request to generate a measurement data element to report the conversion.

In response to being notified the occurrence of a valid conversion, e.g. when detecting that the redirect has the particular form, the application 112 verifies the signature of the blindly signed combined conversion data (316). For example, if the VOPRF protocol was used to blindly sign the combination of the signed impression data and the conversion data, the VOPRF protocol can be used to verify the signature of the blindly signed conversion data. The application 112 can similarly unblind the conversion data (318). For example, the application 112 can unblind the conversion data using the VOPRF protocol. The application 112 can then record the unblind conversion data, e.g., by storing the conversion data as a conversion record at the client device 110. The application 112 can also store, in the conversion record, the blindly signed combined conversion data.

In some implementations, rather than generate measurement data elements to report the conversion and send the measurement data elements upon detection of conversions, the application 112 may add random delay before sending the measurement data elements and/or send measurement data elements in batches. This can prevent time-based attacks and further protect user privacy. For example, by delaying the report, an entity cannot intercept the report and correlate the report to a conversion event that is known to have just occurred.

Figure 4:
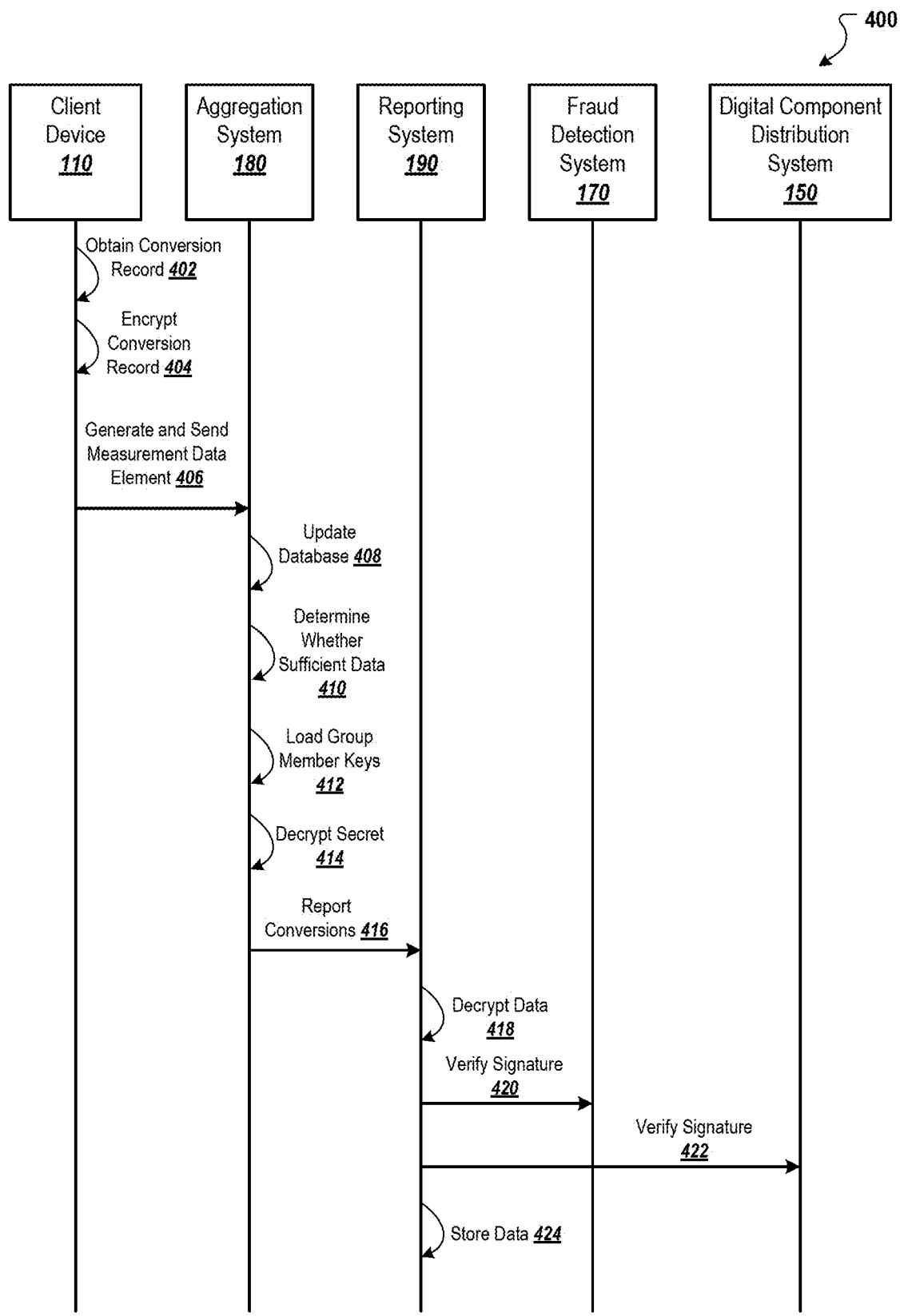
FIG. 4 is a flow diagram that illustrates an example process for reporting conversion data.

FIG. 4 is a flow diagram that illustrates an example process 400 for generating a measurement data element and providing the measurement data element to an aggregation system. The process 400 can be implemented, for example, by a client device 110 and an aggregation system 180 interacting with a fraud detection system 170 and a digital component distribution system 150. Operations of the process 400 can also be implemented as instructions stored on non-transitory computer readable media, and execution of the instructions by one or more data processing apparatus can cause the one or more data processing apparatus to perform the operations of the process 400.

The client device 110 obtains a conversion record (402). As described above, a conversion record can include the blindly signed combined conversion data for a detected conversion. The application 112 executing on the client device 110 can obtain the conversion record, e.g., in response to determining that a randomly chosen delay for reporting the conversion has expired or in response to determining to send a batch of conversion data.

The client device 110 encrypts at least a portion of the conversion record (404). For example, the application 112 can encrypt the blindly signed combined conversion data. In some implementations, the application 112 encrypts the blindly signed combined conversion data using threshold encryption, e.g., using a (t, n)-threshold encryption scheme. By using threshold encryption, the encrypted data cannot be decrypted unless a recipient receives at least t measurement data elements for the same impression and conversion pair, e.g., from at least t applications (e.g., web browsers or native applications or devices).

In some threshold encryption techniques, a dealer provides share of a secret, or a key, to each player which would be each instance of the application 112 in this example. Rather than providing a share of the secret to each application 112 of each client device 110, each instance of the application 112 is configured to generate a group key that encrypts the data. For each application 112 to generate the same group key, each application 112 can generate the group key using the same seed. This seed can be the impression data and/or the conversion data, or based on the impression data and/or the conversion data. The blindly signed combined conversion data for a given impression and conversion pair would be the same assuming that the same entities (e.g., the fraud detection system 170 and the digital component distribution system 150) blindly sign the data for each instance of the application using the same protocol and secret key, also each instance of the application 112 blinds the data using the same protocol.

In one example, the seed can be the blindly signed combined conversion data or a combination of the blindly signed combined conversion data and additional data, such as the reporting URL or the reporting system 190. In another example, the seed can be generated by encrypting the blindly signed combined conversion data using a public key of the reporting system 190 such that only the reporting system 190 can decrypt the impression and conversion data even after the group key is regenerated. For example, the seed can be a combination of the encrypted blindly signed combined conversion data and the reporting URL of the reporting system 190, encrypted using a public key of the reporting system 190.

Different types of (t, n)-threshold encryption schemes can be used to encrypt the impression and conversion data. For example, (t, n)-threshold encryption schemes that use polynomials or planes to distribute shares of a secret (e.g., the impression and conversion data) and recover the secret when at least t share are received can be used. In a particular example, the threshold encryption scheme can be a plane-based encryption scheme in which group key comprises a plane and the measurement data is at a point at which each plane intersects, e.g. Blakley's scheme.

In other examples, the threshold encryption scheme can use Chinese remainder theorem, proactive secret sharing, verifiable secret sharing (VSS), or other appropriate threshold encryption techniques.

In an example polynomial approach, when an application 112 accesses a conversion report, the application 112 can generate a group identifier (e.g., a tag) and a seed value using the seed described above. For example, the application 112 can use a first key derivation function (e.g., a one-way cryptographic hash function) and the seed to generate the group identifier. This group identifier can be a random number that uniquely identifies the impression and conversion pair. Since each application 112 that reports this impression and conversion pair uses the same key derivation function and the same seed, the group identifier will be the same for each application 112 that reports the impression and conversion pair. As described below, the group identifier is used to aggregate the data and determine the quantity of conversions.

The application 112 can use a second key derivation function (e.g., a one-way cryptographic hash function) and the seed to generate the initial value for a pseudorandom number generator. The application 112 can then use the initialized pseudorandom number generator to generate coefficients for a polynomial function of degree $t-1$. The polynomial function serves as the group key in this example.

The polynomial function can be in the form of $A_0+A_1X^1+A_2X^2+, \ldots A_tX^t$, where t is the minimum, e.g., threshold, number of group member keys required to decrypt the data, $X^i$ is the result of X to the power of I, and $A_i$ are the generated coefficients.

Each instance of the application 112 can be configured to pick a particular point on the polynomial function for the secret. For example, each instance of the application 112 can be configured to pick a different point on the polynomial function for the secret. In a particular example, this point can be at X=0 and the secret can be the Y value at X=0, i.e., the value of $A_0$. Other points can also be used. In one implementation, the application 112 can choose random nonce at the impression time, request the fraud detection system 170 to either blindly sign or using public key signature to sign the nonce for public verifiability, then use the signed nonce as the X value of the point. Aggregation system 180 will ignore all points whose X value are not properly signed by the fraud detection system 170.

The application 112 can select a point on the polynomial function as its share of the secret to report to the aggregation system 180. This share of the secret is the group member key. To enable each instance of the application 112 to select a different point such that the secret can be determined from t group member keys, each instance of the application 112 can be configured to select its point using data related to the instance of the application 112 or the client device 110 on which the instance of the application 112 is running. For example, the application 112 can select its point on the polynomial function using a unique application identifier that uniquely identifies the instance of the application 112 or a unique device identifier that uniquely identifies the client device 110. In a particular example, the application 112 can use a third key derivation function (e.g., a one-way cryptographic hash function), the unique application identifier or the unique device identifier, and the seed to select the point on the polynomial function. Optionally, the application 112 can request the fraud detection system 170 or digital component distribution system (on behalf of digital component provider where the conversion occurs) to sign the X coordinate of the selected point upon validation that the impression and/or the conversion is real, then select the signed X coordinate as the X coordinate to calculate the share of secret.

The client device 110 generates a measurement data element and sends the measurement data element to the aggregation system (406). In some implementations, the measurement data element includes the group member key, e.g., the coordinates of the point on the polynomial selected by the application 112) and the group identifier (e.g., tag). For example, the group identifier and the group member key can represent a key/value pair.

The aggregation system 180 receives the measurement data element and updates a database of measurement data elements (408). For example, the aggregation system 180 can store each received measurement data element in the database or another data structure or data storage device. The aggregation system 180 can also update a count of group member keys that have been received for the group identifier.

The aggregation system 180 determines whether sufficient data has been received to decrypt the encrypted text (410). As described above, at least t distinct group member keys must be received to regenerate the group key and decrypt the impression and conversion data. The aggregation system 180 can compare the count of the group member keys for the group identifier to the threshold t.

If fewer than t measurement data elements with the group identifier have been received, the aggregation system 180 can continue to wait for additional measurement data elements with the same group identifier. If at least t measurement data elements having the same group identifier have been received, the aggregation system 180 loads the group member keys (412).

The aggregation system 180 can then decrypt the secret (414). As described above, the secret can be the blindly signed combined conversion data, a combination of the blindly signed combined conversion data and additional data (e.g., the reporting URL of the reporting system 190), or a combination of encrypted blindly signed combined conversion data (using the reporting system's public key) and the reporting URL of the reporting system 190. To decrypt the secret, the aggregation system 180 can regenerate the group key or a representation of the group key using the group member keys. For example, if a polynomial function approach is used to encrypt the secret, the aggregation server 190 can regenerate the polynomial function using the points defined by the group member keys of at least t measurement data elements that have the group identifier. The aggregation system 190 can interpolate between these points to regenerate the polynomial function. The aggregation system 190 can then identify the particular point for which the value is the secret.

The aggregation system 180 reports the conversions to the reporting system 190 (416). The aggregation system 180 can generate and send, to the reporting system, data that includes the impression and conversion data (which may still be encrypted) and the number of conversions. The aggregation system 180 can determine, as the number of conversions, the number of distinct group member keys received in the measurement data elements that include the group identifier corresponding to the impression and conversion pair. That is, the number of conversions is the number of distinct measurement data elements that include the group identifier.

The impression and conversion data in the reported data can be the blindly signed combined conversion data or this data encrypted using the public key of the reporting system 190. For example, as described above, the secret can be a combination of the blindly signed combined conversion data and the reporting URL of the reporting system 190. The aggregation system 180 can access the reporting URL after obtaining the secret and send the remaining information of the secret to the reporting system 190 along with the quantity of conversions.

The reporting system 190 decrypts the encrypted blindly signed combined conversion data (if encrypted) using its private key that corresponds to the public key that was used to generate the encrypted reporting data (418). The reporting system 190 can optionally verify the signature associated with impression and conversion data. In some implementations that adopt VOPRF for blind signatures, the signature verification requires the reporting system 190 to contact the fraud detection system 170 that blindly signed the impressions data previously.

The reporting system 190 verifies the signature of the impression data generated by the fraud detection system (420). For example, the reporting system 190 can send the blindly signed combined conversion data to the fraud detection system 170 along with a request to verify the blind signature of the blinded impression data that was generated by the fraud detection system 170. The fraud detection system 170 can attempt to verify the signature and respond to the reporting system 190 with data specifying whether the signature is valid.

Similarly, the reporting system 190 can verify the signature of the combination of the blinded impression data and the conversion data (422). For example, the reporting system can send the blindly signed combined conversion data to the digital component distribution system 150 along with a request to verify the blind signature of the combination of the blinded impression data and the conversion data that was generated by the digital component distribution system 150. The digital component distribution system 150 can attempt to verify the signature and respond to the reporting system 190 with data specifying whether the signature is valid.

If both signatures are valid, the reporting system can store data specifying the number of conversions for the impression and conversion pair (424). The reporting system 190 can provide, to a digital component publisher 160, data specifying the number of conversions for each impression and conversion pair for the digital component(s) published by the digital component publisher 160 after a sufficient number of conversions (e.g., at least t) have occurred to allow for encryption.

After receiving at least t measurement data elements for a given impression and conversion pair, the aggregation system 180 can decrypt any additional measurement data elements that are received and that includes the group identifier for the impression and conversion pair in a similar manner using the data of the previously received measurement data elements. In this way, the aggregation system 180 can continue to update the number of conversions for the impression and conversion pair.

In some implementations, the number of conversions are determined for each of multiple dimensions. The dimensions can be various dates or date ranges, various locations, etc. For example, a digital component publisher 160 may want to know the number of conversions of a digital component for each month of the year. To have separate measurements for each dimension, the secret in the (t, n)-encryption scheme can be based on the value of the dimension for that conversion. For example, if a polynomial technique is used, both the seed and tag (e.g., group identifier) can be any of the seeds/tags described above combined with the value of the dimension. In a particular example, the seed can be a combination of the blindly signed combined conversion data and the value for the dimension optionally transformed by crypto hash or encryption function. In this way, the application will generate a different polynomial function and a different group identifier for each value of each dimension.

The number of conversions can also be determined for combinations of dimensions. In this example, the seed can be any of the seeds described above combined with the value of each dimension. In a particular example, the seed can be a combination of the blindly signed combined conversion data and the value for each dimension.

The above techniques can be further adapted to prevent Sybil attacks, e.g., if the application 112 is compromised after computing the plain text value of combined conversion data. If it is compromised, the application 112 may share the plain text value with any number of other applications 112, all of which can report the same plain text value to the same aggregation system 180, which would defeat the k-anonymity protection of the (t, n)-threshold encryption scheme. To prevent the Sybil attack, the uniqueness of the legitimate impressions/conversions can be supported using the process illustrated in FIG. 5.

Figure 5:
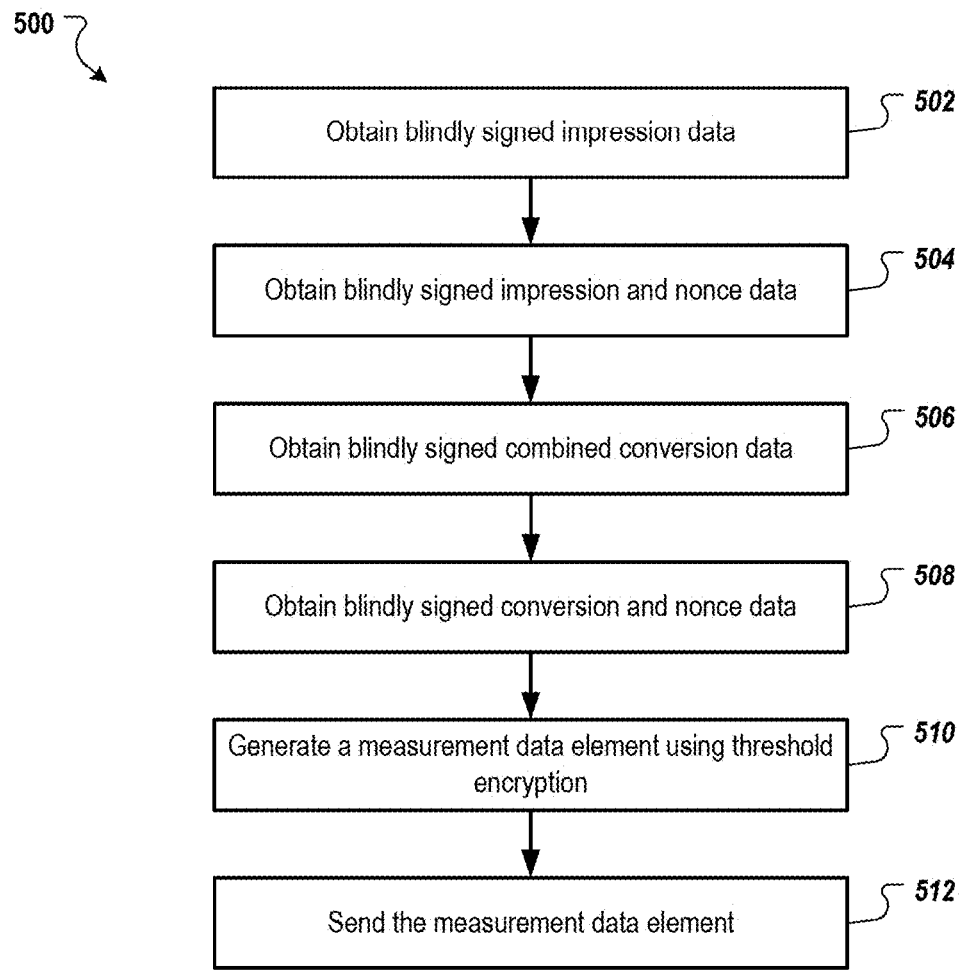
FIG. 5 is a flow diagram that illustrates another example process for reporting conversion data.

FIG. 5 is a flow diagram that illustrates another example process 500 for reporting conversion data. The process 500 can be implemented, for example, by a client device, such as the client device 110 of FIG. 1. Operations of the process 500 can also be implemented as instructions stored on non-transitory computer readable media, and execution of the instructions by one or more data processing apparatus can cause the one or more data processing apparatus to perform the operations of the process 500.

Blindly signed impression data is obtained (502). As described above, when a digital component is presented with content, e.g., a web page or application content, the application presenting the content can store impression data for the impression of the digital component. The impression data for a particular presentation of a digital component can include a URL or domain of a landing page for the digital component (e.g., a page linked to by the digital component), one or more identifiers for the digital component, event-level data associated with the impression, an expiration time that specifies when the impression data is to be deleted from the client device, and/or a reporting URL or domain to which conversion reports for the digital component are to be sent.

The impression data can be blinded and sent to another device or system, such as the fraud detection system 170 of FIG. 1, along with fraud detection signals. In this example, rather than blind the impression data by itself, the application 112 can encrypt the combination of the impression data and a clicked value (e.g., whether the user clicked or otherwise interacted with the digital component) using a public key fetched from a reporting system, e.g., the reporting system 190 of FIG. 1. The application 112 then blinds to encryption result, and sends the blinded encryption result to the fraud detection system 170 for blind signature. The fraud detection system 170 can determine whether the impression is valid based on the fraud detection signals, and if so, blindly sign the blinded impression data using a first impression blind signing key maintained confidentially by the fraud detection system 170. The fraud detection system 170 can return the blindly signed impression data to the client device 110.

Blindly signed impression and nonce data is obtained (504). The application 112 executing on the client device 110 can randomly create a nonce with sufficient entropy, e.g., a 32-byte random number. The client device 110 can then generate a hash-based message authentication code (HMAC), e.g., a HMACSHA256 message code using a combination of the blinded impression data, the clicked value, and the nonce. The application 112 can send this impression nonce message code to the fraud detection system 170 with a request to blindly sign the impression nonce message code. If the impression is valid, as described above, the fraud detection server can blindly sign the impression nonce message code using a second impression blind signing key maintained confidentially by the fraud detection system 170. The second impression blind signing key of the fraud detection system 170 is different from the first blind signing key of the fraud detection system 170 so as to not be able to get a signature for an impression and claims it is a signature for a nonce and vice versa. The fraud detection system 170 can return the blindly signed impression nonce message code to the client device 110.

Blindly signed combined conversion data is obtained (506). When a conversion occurs, the system that determined that the conversion occurred, e.g., the digital component distribution system 150 of FIG. 1, can provide conversion data to the application 112. The application 112 can generate blinded conversion and impression data by encrypting a combination of the conversion data and HMAC code, e.g., an HMAC SHA256 message code of the impression data. For example, the client device can combine this impression message code and the conversion data and encrypt this combination using the public key fetched from the reporting system 190 of FIG. 1.

The application 112 can then send the blindly signed impression data and the blinded conversion and impression data to the digital component distribution system 150 with a request to blindly sign this combination of data. The digital component distribution system 150 can blindly sign the combination of the blindly signed impression data and the blinded conversion and impression data using a first conversion blind signing key of the digital component distribution system 150. This blindly signed data is the blindly signed combined conversion data in this example.

Blindly signed conversion and nonce data is obtained (508). This nonce can be the same as the nonce used to obtain the blindly signed impression and nonce data. The application 112 can generate a HMAC, e.g., a HMAC-SHA256 message code using a combination of the blinded conversion data and the nonce. The client device 110 can send this conversion nonce message code to the digital component distribution system 150 with a request to blindly sign the conversion nonce message code. If the conversion is valid, as described above, the fraud detection server can blindly sign the conversion nonce message code using a second conversion blind signing key maintained confidentially by the digital component distribution system 150. The second conversion blind signing key of the digital component distribution system 150 is different from the first conversion blind signing key of the digital component distribution system 150 so as to not be able to get a signature for a conversion and claims it is a signature for a nonce. The digital component distribution system 150 can return the blindly signed conversion nonce message code to the client device 110.

A measurement data element is generated (510). In this example, the application 112 can generate a measurement data element that includes a group member key that represents a share of a secret (e.g., the impression and conversion data), a group identifier, and a unique key.

The application 112 can generate the unique key by generating a combined message that includes the blindly signed impression nonce message code, the blindly signed conversion nonce message code, and the nonce. Each portion of the combined message can be included in a respective field of the combined message. The application 112 can then generate the unique key by encrypting the combined message using the blindly signed combined conversion data as the encryption key.

The application 112 can generate the group member key using threshold encryption, similar to the way in which the group member key is generated using the process 400 of FIG. 4. For example, the group member key can be generated using a polynomial technique and the seed can be the blindly signed combined conversion data, a combination of the blindly signed combined conversion data and additional data (e.g., the reporting URL of the reporting system 190), or a combination of encrypted blindly signed combined conversion data (using the reporting system's public key) and the reporting URL of the reporting system 190.

The application 112 can also generate the group identifier, similar to the way in which the group identifier is generated using the process 400 of FIG. 4. For example, the application 112 can use a key derivation function (e.g., a one-way cryptographic hash function) and the seed to generate the group identifier.

The application 112 can send the measurement data element that includes the group member key, the unique key, and the group identifier. For example, the application 112 can send the measurement data element to an aggregation system, such as the aggregation system 180 of FIG. 1. The application can send the measurement data element after a randomly chosen (or pseudorandom) time period elapses after the conversion is detected to prevent time-based attacks.

Figure 6:
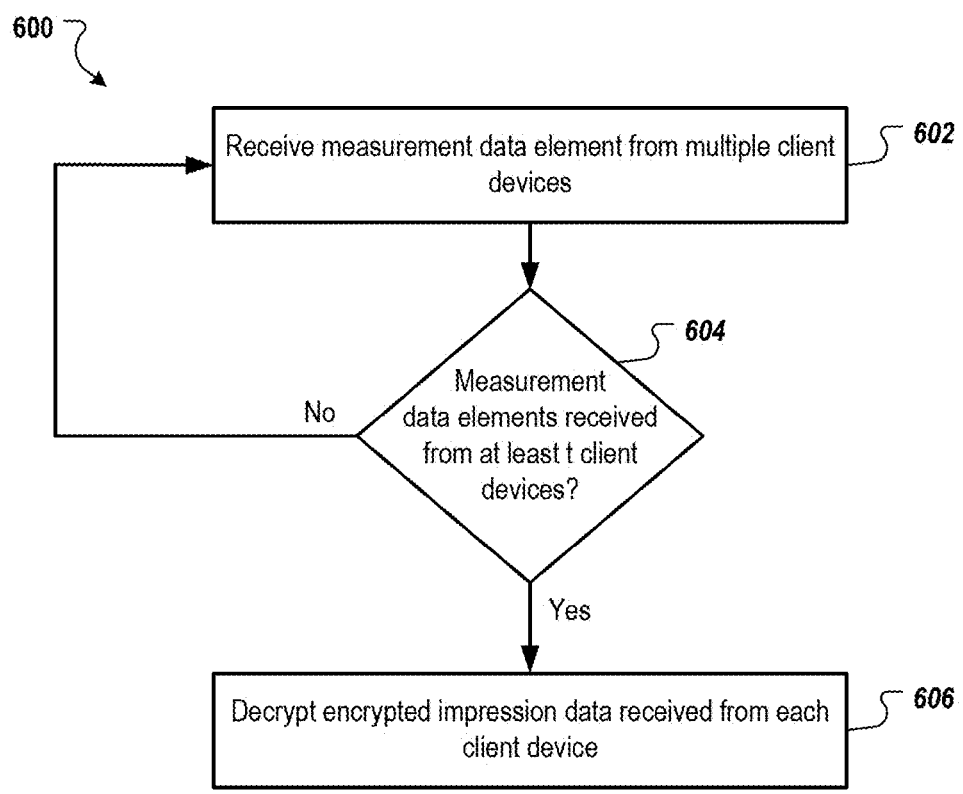
FIG. 6 is a flow diagram that illustrates an example process for decrypting impression data.

FIG. 6 is a flow diagram that illustrates an example process 600 for decrypting impression data. The process 600 can be implemented, for example, by one or more servers, such as the aggregation system 180 and/or the reporting system 190 of FIG. 1. Operations of the process 600 can also be implemented as instructions stored on non-transitory computer readable media, and execution of the instructions by one or more data processing apparatus can cause the one or more data processing apparatus to perform the operations of the process 600.

A measurement data element is received from a client device (602). For example, an application 112, e.g., a web browser or native application, executing on the client device 110 can generate and send the measurement element in response to an impression and conversion (e.g., an impression and conversion pair) being detected. In some implementations, as described above with reference to FIG. 4, the measurement data element can include a group member key and a group identifier.

In some implementations, as described above with reference to FIG. 5, the measurement data element can include a group member key, a group identifier, and a unique key. In either implementation, the group member key can be generated using (t, n)-threshold encryption techniques using a seed that is based on the impression data for the impression and a threshold t.

A determination is made whether at least t measurement data elements for the impression and conversion pair have been received (604). For example, the number of distinct measurement data elements that have been received and that include the group identifier for the impression and conversion pair can be counted. This count can be compared to the threshold t.

If less than the threshold t distinct measurement data elements for the impression and conversion pair have been received, the process 600 can return to operation 602 to wait for additional measurement data elements for the impression and conversion pair as the secret (e.g., the impression and conversion data) cannot be decrypted until at least t measurement data elements for the impression and conversion pair have been received.

If at least the threshold t distinct measurement data elements for the impression and conversion pair have been received, the encrypted impression data of each measurement data element is decrypted. In implementations in which the measurement data elements include a group member key and group identifier, the encrypted impression data can be decrypted as described above with reference to FIG. 4.

In implementations in which the measurement data elements include group member key, a group identifier, and a unique key, the blindly signed combined conversion data and the reporting URL can be recovered by regenerating the group key, as described above with reference to FIG. 4. The recovered conversion data and recovered impression data can be unblinded using the protocol that was used to blind the data.

The combined message that includes the blindly signed impression nonce message code, the blindly signed conversion nonce message code, and the nonce can be recovered by decrypting the unique key using the blindly signed combined conversion data. The blindly signed impression nonce message code and the blindly signed conversion nonce message code can then be verified using the blindly signed impression data, the blindly signed conversion and impression data, and the nonce. For example, the aggregation system 180 can compute a blindly signed impression nonce message code (e.g., the HMACSHA256 message code) using the recovered impression data and the nonce and compare this to the recovered blindly signed impression nonce message code. Similarly, the aggregation system 180 can compute a blindly signed conversion nonce message code (e.g., the HMACSHA256 message code) using the recovered impression and conversion data and the nonce and compare this to the recovered blindly signed conversion nonce message code. If both match, then both recovered codes are verified.

The fraud detection system 170 can then verify the blind signature of the impression data and the blind signature of the impression and nonce data. Similarly, the digital component distribution system 150 can verify the blind signature of the blindly signed conversion data and the blind signature of the blindly signed conversion and nonce data.

The number of unique nonces in the measurement data elements for the impression and conversion pair can then be determined to ensure k-anonymity. The number of unique nonces in the measurement data elements for the impression and conversion pair can then be determined to ensure k-anonymity. The number of unique nonces is the number of browsers (or applications) that reported the impression/conversion event. If the number of unique nonces is greater than k, the report system will report the conversion numbers to the digital component distribution system, knowing that at least k browsers have seen the event. If the number of unique nonces is less than k, the report system will not report the conversion numbers, therefore enforcing k-anonymity. A compromised browser cannot fake additional nonces in a way to evade the verification described above.

If all of the above validations are successful, then the impressions and conversions are valid and not part of a Sybil attack. In response to determining that each of the validations are successful, the blindly signed impression data, the blindly signed conversion and impression data, and the number of unique nonces can be sent to the reporting system 190 using the reporting URL. The reporting system 190 can then recover the impression data using the private key that corresponds to the public key that was used to encrypt the impression data. The reporting system 190 can similarly recover the conversion data by decrypting the blindly signed conversion and impression data using the private key that was used to encrypt the blinded conversion and impression data.

Figure 7:
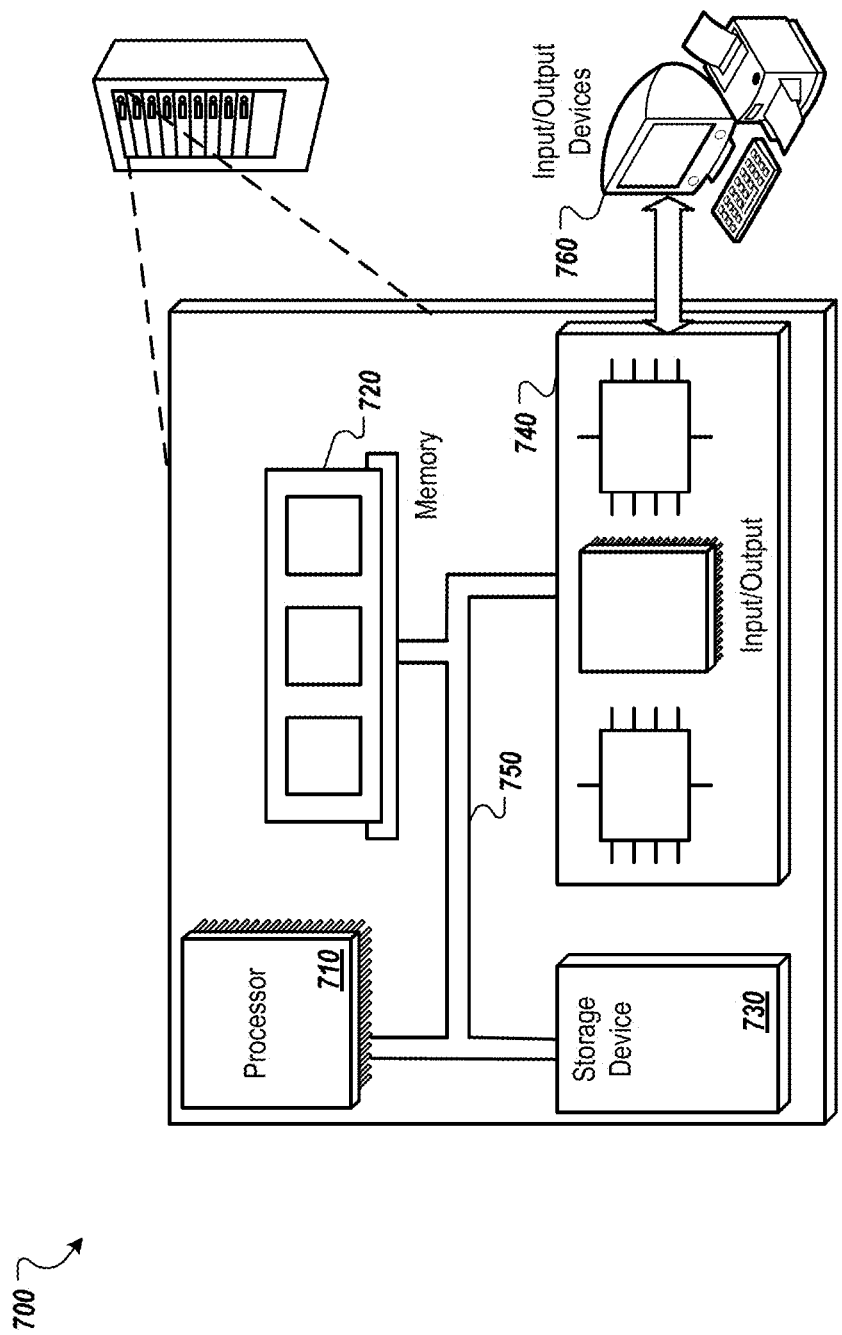
FIG. 7 is block diagram of an example computer system.

FIG. 7 is a block diagram of an example computer system 700 that can be used to perform operations described above. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In some implementations, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In some implementations, the memory 720 is a volatile memory unit. In another implementation, the memory 720 is a non-volatile memory unit.

The storage device 730 is capable of providing mass storage for the system 700. In some implementations, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 700. In some implementations, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 760, e.g., keyboard, printer and display devices. Other implementations, however, can also be used, such as mobile computing devices, mobile communication devices, set-top box television client devices, etc.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving reporting data comprising blindly signed impression data for a presentation of a digital component and signed conversion data for a conversion event corresponding to the presentation of the digital component, wherein the blindly signed impression data comprises blinded impression data and a first digital signature generated using the blinded impression data, and wherein the signed conversion data comprises the conversion data and a second digital signature generated using the conversion data;
requesting verification of the first digital signature of the blindly signed impression data from a first system that generated the first digital signature using the blinded impression data;
requesting verification of the second digital signature of the signed conversion data from a second system that generated the second signature using the conversion data, wherein the second system comprises a digital component distribution system that (i) provided the digital component to a client device corresponding to the presentation of the digital component and (ii) generated the second signature in response to detecting a conversion event after presentation of the digital component at the client device; and
updating impression data and conversion data for the digital component in response to successful verification of the first digital signature and the second digital signature.

2. The computer-implemented method of claim 1, wherein the first system comprises a fraud detection system that generated the first digital signature based on an evaluation of fraud detection signals received from a client device that presented the digital component.

3. The computer-implemented method of claim 1, wherein the reporting data comprises blindly signed combined conversion data that includes an encryption result from encrypting the blindly signed impression data and the signed conversion data, the method comprising decrypting the encryption result to obtain the blindly signed impression data and the signed conversion data.

4. The computer-implemented method of claim 1, wherein the reporting data comprises a number of conversions, wherein updating the conversion data for the digital component comprises updating the conversion data based on the number of conversions of the reporting data.

5. The computer-implemented method of claim 1, comprising sending the impression and conversion data for the digital component to a digital component publisher.

6. The computer-implemented method of claim 1, wherein the reporting data is received from by a reporting system from an aggregation system that sent the reporting data to the reporting system in response to receiving at least a threshold number of measurement data elements that include a same group member key.

7. A system, comprising:
one or more processors; and
one or more computer-readable media storing instructions that, when executed by the one or more processors, cause the one or more processors to perform operations comprising:
receiving reporting data comprising blindly signed impression data for a presentation of a digital component and signed conversion data for a conversion event corresponding to the presentation of the digital component, wherein the blindly signed impression data comprises blinded impression data and a first digital signature generated using the blinded impression data, and wherein the signed conversion data comprises the conversion data and a second digital signature generated using the conversion data;
requesting verification of the first digital signature of the blindly signed impression data from a first system that generated the first digital signature using the blinded impression data;
requesting verification of the second digital signature of the signed conversion data from a second system that generated the second signature using the conversion data, wherein the second system comprises a digital component distribution system that (i) provided the digital component to a client device corresponding to the presentation of the digital component and (ii) generated the second signature in response to detecting a conversion event after presentation of the digital component at the client device; and
updating impression data and conversion data for the digital component in response to successful verification of the first digital signature and the second digital signature.

8. The system of claim 7, wherein the first system comprises a fraud detection system that generated the first digital signature based on an evaluation of fraud detection signals received from a client device that presented the digital component.

9. The system of claim 7, wherein the reporting data comprises blindly signed combined conversion data that includes an encryption result from encrypting the blindly signed impression data and the signed conversion data, the operations comprising decrypting the encryption result to obtain the blindly signed impression data and the signed conversion data.

10. The system of claim 7, wherein the reporting data comprises a number of conversions, wherein updating the conversion data for the digital component comprises updating the conversion data based on the number of conversions of the reporting data.

11. The system of claim 7, wherein the operations comprise sending the impression and conversion data for the digital component to a digital component publisher.

12. The system of claim 7, wherein the reporting data is received from by a reporting system from an aggregation system that sent the reporting data to the reporting system in response to receiving at least a threshold number of measurement data elements that include a same group member key.

13. One or more non-transitory computer-readable media storing instructions that, when executed by one or more computers, cause the one or more computers to perform operations comprising:

receiving reporting data comprising blindly signed impression data for a presentation of a digital component and signed conversion data for a conversion event corresponding to the presentation of the digital component, wherein the blindly signed impression data comprises blinded impression data and a first digital signature generated using the blinded impression data, and wherein the signed conversion data comprises the conversion data and a second digital signature generated using the conversion data;

requesting verification of the first digital signature of the blindly signed impression data from a first system that generated the first digital signature using the blinded impression data;

requesting verification of the second digital signature of the signed conversion data from a second system that generated the second signature using the conversion data, wherein the second system comprises a digital component distribution system that (i) provided the digital component to a client device corresponding to the presentation of the digital component and (ii) generated the second signature in response to detecting a conversion event after presentation of the digital component at the client device; and updating impression data and conversion data for the digital component in response to successful verification of the first digital signature and the second digital signature.

14. The one or more non-transitory computer-readable media of claim 13, wherein the first system comprises a fraud detection system that generated the first digital signature based on an evaluation of fraud detection signals received from a client device that presented the digital component.

15. The one or more non-transitory computer-readable media of claim 13, wherein the reporting data comprises blindly signed combined conversion data that includes an encryption result from encrypting the blindly signed impression data and the signed conversion data, the operations comprising decrypting the encryption result to obtain the blindly signed impression data and the signed conversion data.

16. The one or more non-transitory computer-readable media of claim 13, wherein the reporting data comprises a number of conversions, wherein updating the conversion data for the digital component comprises updating the conversion data based on the number of conversions of the reporting data.

17. The one or more non-transitory computer-readable media of claim 13, wherein the operations comprise sending the impression and conversion data for the digital component to a digital component publisher.

18. The one or more non-transitory computer-readable media of claim 13, wherein the reporting data is received from by a reporting system from an aggregation system that sent the reporting data to the reporting system in response to receiving at least a threshold number of measurement data elements that include a same group member key.

19. A computer-implemented method comprising:

receiving reporting data comprising blindly signed combined conversion data that includes an encryption result from encrypting (i) blindly signed impression data for a presentation of a digital component and (ii) signed conversion data for a conversion event corresponding to the presentation of the digital component, wherein the blindly signed impression data comprises blinded impression data and a first digital signature generated using the blinded impression data, and wherein the signed conversion data comprises the conversion data and a second digital signature generated using the conversion data;

decrypting the encryption result to obtain the blindly signed impression data and the signed conversion data;

requesting verification of the first digital signature of the blindly signed impression data from a first system that generated the first digital signature using the blinded impression data;

requesting verification of the second digital signature of the signed conversion data from a second system that generated the second signature using the conversion data; and updating impression data and conversion data for the digital component in response to successful verification of the first digital signature and the second digital signature.

* * * * *